(12) United States Patent
Haag (10) Patent No.: US 7,654,575 B1
(45) Date of Patent: Feb. 2, 2010

(54) PERSONALIZED BOOK

(75) Inventor: Maia B. Haag, Deephaven, MN (US)

(73) Assignee: I See Me! Inc., Deephaven, MN (US)

( * ) Notice: Subject to any disclaimer, the term of this patent is extended or adjusted under 35 U.S.C. 154(b) by 0 days.

(21) Appl. No.: 12/191,729

(22) Filed: Aug. 14, 2008

(51) Int. Cl.
*B42D 1/00* (2006.01)
*B42D 3/18* (2006.01)
*B42D 15/00* (2006.01)

(52) U.S. Cl. ............... 281/15.1; 283/117; 283/63.1; 281/3.1; 281/51

(58) Field of Classification Search ............. 40/107; 206/232, 424, 459.5, 497; 270/1.02, 1.03, 270/21.1; 273/155; 281/15.1, 51; 283/2, 283/63.1, 67, 117; 412/4, 8, 16, 19, 32; 434/236, 434/237, 238, 304; *B41F 13/54; B42C 19/00; B42D 15/ 00; G09B 19/12*
See application file for complete search history.

(56) References Cited

U.S. PATENT DOCUMENTS

| | | | | |
|---|---|---|---|---|
| 5,397,156 | A | * | 3/1995 | Schach et al. ............ 283/67 |
| 5,636,957 | A | | 6/1997 | Hefty |
| 5,782,598 | A | * | 7/1998 | Salzberger ................ 412/4 |
| 6,012,890 | A | * | 1/2000 | Celorio Garrido ......... 412/19 |
| 6,280,200 | B1 | * | 8/2001 | Cunningham ............. 434/304 |
| D456,447 | S | | 4/2002 | Ader et al. |
| 7,148,990 | B2 | | 12/2006 | Atkins et al. |
| 2002/0001102 | A1 | | 1/2002 | Williams |
| 2004/0051295 | A1 | | 3/2004 | Gross et al. |
| 2006/0167585 | A1 | | 7/2006 | Lebovic |
| 2007/0172280 | A1 | | 7/2007 | Dwyer |
| 2008/0068666 | A1 | | 3/2008 | Niblett et al. |

FOREIGN PATENT DOCUMENTS

CA 2429251 11/2004

OTHER PUBLICATIONS

Canton (Massachusetts) Public Schools, "5th Grade Autobiography," www.cantonma.org, 4 pgs, accessed Jun. 4, 2008.
Creations by You, www.creationsbyyou.com, 2 pgs., accessed Aug. 20, 2008.
Family History Products, www.familyhistoryproducts.com/memorygrabber.html, 16 pgs., accessed Jun. 4, 2008.
Read, Write, Think, "Summer Activities," www.readwritethink.org/beyondtheclassroom/summer/gradesK_2/PhotoStories/, 2 pgs., accessed Jun. 4, 2008.

* cited by examiner

*Primary Examiner*—Dana Ross
*Assistant Examiner*—Justin V Lewis
(74) *Attorney, Agent, or Firm*—Brooks, Cameron & Huebsch, PLLC (57) ABSTRACT

Embodiments of the present disclosure include personalized books as well as methods and kits for providing personalized books. One method includes: providing an adult with a list of interview information to be obtained from a child; providing the adult with a list of particular drawings to be obtained from the child; obtaining the interview information from the child in the form of a number of personal comments provided by the child; obtaining a number of drawings from the list of particular drawings, the number of drawings independently created by the child at the direction of the adult; and creating a personalized book by combining the obtained number of drawings created by the child and the obtained number of personal comments in a particular arrangement.

18 Claims, 7 Drawing Sheets

Interview Information Form

My name is ______________________ (child's first name, to be listed as the author of the book)

My nickname is ______________________.

I am ___ (number) years old. My birth date is __________(month) _____ (day) _____ (year).

I have ____________ (color) hair and ____________ (color) eyes.

My favorite color is ______________ and my favorite food is__________________.

The best things about me are _______________.

The people in my family are _______________.

I love ____________ because____________.

The other special people in my life are______________.

If I could give them anything, I would give them_____________.

My favorite toy is ____________ because____________.

If I were a superhero, my power would be_____________.

When I grow up, I want to be _________________.

The most beautiful place that I have ever visited is______________________.

There are _________ (number) people in the world. I would like to help the world by______________________________________________________________.

I live in ______________ (city), _____________ (state).

My favorite thing to do is ________________________________.

My favorite sport is ___________________________________.

PERSONALIZED BOOK

BACKGROUND

Various examples of personalized children's books exist. Some children's books can include personalized text and/or graphics. In one specific example, a purchaser wishing to order a book can fill out and mail to the publisher a personalization form that is filled out with factual data. In accordance with the supplied data, the text is personalized to feature the child as a character in a story and individual physical characteristics of the selected child are superimposed onto a pre-printed, relatively generic, background of illustrations. In this example, a laser printer is used to overprint the personalization over preprinted background pages. Books produced under such a system may include personalization features such as a name in text, and certain other basic features in the overprinted graphics (i.e., skin tone and hair color).

In another specific example of a previous children's book, a completely pre-bound blank board book is utilized with personalized stickers that are printed and affixed to the pages of the board book. The book is printed and bound by the publisher using standard publishing methods, except that blank areas are left in specific locations on the inside pages. The purchaser buys the partially blank book. A personalization form included with the book is then filled out and the data is sent to the publisher. The publisher prints personalized stickers and mails them to the purchaser. The purchaser inserts the stickers into the appropriate blank spaces in the book. The storyline text in these books is personalized to a small degree, but the illustrations are not personalized.

In still another example, a software program containing a generic story is loaded into a computer at the point of sale. Personalized data from a customer is entered into the program and merged into the story. The personalized story text is printed onto blank areas on sheets of paper that have pre-printed illustrations covering one side and partially covering the other side. The finished sheets are assembled and bound with the cover. In this example, some personalization of the generic storyline text is provided, but no personalization of the illustrations or of the cover are provided.

Various previous personalized children's books and/or kits for making personalized children's books include little creative content and input by the customer who wishes to obtain the book. For instance, previous books have focused on developing stories that are pre-written (e.g., the storyline is pre-set) with a few pieces of information provided by the customer that are inserted into the pre-set storyline. As such, little creative input of the customer is included in the book.

Also, various previous personalized books include little or no actual creative input provided by the subject of the book (i.e., the child). For instance, the child may become part of pre-written story as a character, but the book is not written by, or focused on, the child. As such, various previous approaches do not serve as a way of recording the way that a particular child thinks at a particular stage in that child's life. Moreover, various previous personalized books do not use illustrations drawn by the child, such that the books do not serve as a way of recording how the child draws at the particular stage in the child's life. Furthermore, various previous approaches can be relatively impersonal in that they do not involve interaction between an adult (i.e., a parent, guardian, or teacher, for instance) and a child in obtaining creative content to be used in the book.

DETAILED DESCRIPTION

Embodiments of the present disclosure can include personalized books as well as kits and methods for providing personalized books. One method includes: providing an adult with a list of interview information to be obtained from a child; providing the adult with a list of particular drawings to be obtained from the child; obtaining the interview information from the child in the form of a number of personal comments provided by the child; obtaining a number of drawings from the list of particular drawings, the number of drawings independently created by the child; and creating a personalized book by combining the obtained number of drawings created by the child and the obtained number of personal comments in a particular arrangement.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, or mechanical changes may be made without departing from the scope of the present disclosure.

Figure 1:
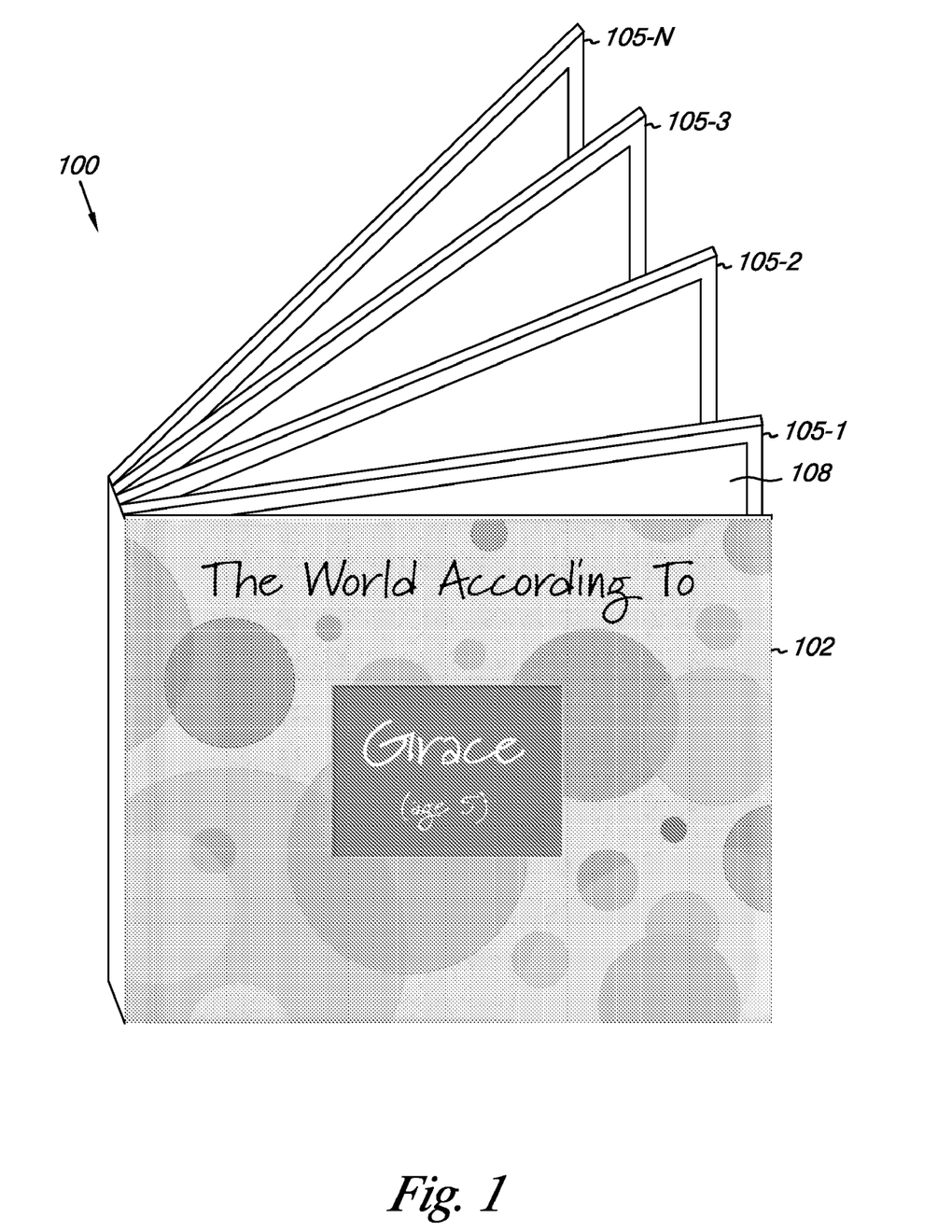
FIG. 1 illustrates an example of a personalized book in accordance with one or more embodiments of the present disclosure.

FIG. 1 illustrates an example of a personalized book 100 in accordance with one or more embodiments of the present disclosure. In various embodiments, the personalized book 100 can be a children's book such as a hardcover or board book, although embodiments are not so limited. For instance, in some embodiments, the personalized book can be in an electronic format. It should be understood that the particular type of medium used may be varied depending on the application and intended use of the published product. For example, the various embodiments of the present disclosure may include a mixed media presentation application such as, though not limited to, a book presenting fixed content (e.g., static text and illustrations) and a combination of animated text (e.g., scrolling text), graphics (e.g., multiple photos/illustrations that can be sequentially presented to the reader and/or video clips), and sound.

As illustrated in the embodiment shown in FIG. 1, the book 100 includes a cover 102 and a number of pages 105-1, 105-2, 105-3, and 105-N. The designator "N" is used to indicate that book 100 can include a number of pages. Embodiments are not limited to a particular number of pages contained in a book (e.g., book 100).

One or more of the pages 105-1, 105-2, 105-3, and 105-N can include creative content 108. As described further herein, in various embodiments, the actual creative content 108 on the pages 105-1, 105-2, 105-3, and 105-N is associated with a list of interview information to be obtained from a child. The interview information to be obtained from the child can be obtained via a number of open-ended questions and/or fill-in-the-blank questions, which can be answered by the child. In one or more embodiments, the child's answers can be recorded by an adult. The actual creative content 108 on the pages 105-1, 105-2, 105-3, and 105-N can also be associated with a list of particular drawings to be obtained from the child. The list of particular drawings can include a number of suggested drawings for the child to create for inclusion in the personalized book.

As an example, in various embodiments, the creative content 108 can include the child's actual answers to questions, the child's independently created drawings, and/or information related to the child's drawings (e.g., the child's statements or comments and/or descriptions of his/her drawings), among various other creative content that can be incorporated into the pages 105-1, 105-2, 105-3, and 105-N of the personalized book 100.

In various embodiments, a third party (e.g., a retail or publishing entity, among other entities) can provide an adult (e.g., a parent, a grandparent, a guardian, or a teacher of the child) with a personalized book kit that contains the list of interview information and/or the list of particular drawings to be obtained from the child. An example of a kit in accordance with one or more embodiments of the present disclosure is described further in connection with FIG. 2. The kit can be mailed to an adult or one or more portions of the kit can be provided to the adult electronically (e.g., through the Internet via an online website). In various embodiments, the kit can include a postage paid envelope such that the child's independently created drawings and/or the interview information obtained from the child (e.g., the child's personal comments and/or answers to questions) can be mailed to the publisher for inclusion in the book.

As an example, the adult can complete an interview information form such as form 301 described below in connection with FIG. 3. The adult can complete the form based on information provided by the child to the adult. For instance, the adult can fill in a number of fields (i.e., blanks) of the form with comments, descriptions, and/or answers provided by the child. As an example, the interview information to be provided in the interview information form can include names of friends, names of family members, a favorite toy, a favorite game, a favorite food, a favorite sport and/or answers to one of a number of open ended questions, among various other types of interview information. An interview information form (e.g., 301 shown in FIG. 3) can be a questionnaire type form or can include a questionnaire to be completed by the child.

The completed interview information form can then be provided to a third party such that the information can be incorporated into the personalized book 100. In one or more embodiments, the interview information form can be all online form such that the interview information can be provided to the publisher electronically (i.e., by entering the interview information into data fields via an online website).

In various embodiments, the interview information obtained from the child can be combined with the one or more particular drawings independently created by the child in a particular arrangement on the pages (e.g. 105-1, 105-2, 105-3, and 105-N) to create the personalized book (e.g., book 100). Examples of interview information obtained from the child combined with child created drawings in a particular arrangement are described further below in connection with FIGS. 4 and 5. The particular drawings can be created by the child at the direction of the adult. For instance, the adult can direct the child which particular drawings from the list of drawings to create. In various embodiments, the list of particular drawings is a list of suggested drawings to be created by the child. In some embodiments, the child and/or adult can select a number of drawings from the suggested list to create. In various embodiments, a child can create one or more drawings to be included in the personalized book which are not from the suggested list (e.g., the child can provide a number of different drawings in addition to, or instead of, the particular drawings on the list).

In various embodiments, the particular arrangement of the creative content 108 on the pages 105-1, 105-2, 105-3, and 105-N of the book 100 can be predetermined by the publisher. In one or more embodiments the particular arrangement of the creative content 108 on the pages 105-1, 105-2, 105-3, and 105-N of the book 100 can be determined by the adult (e.g., the purchaser of the book).

In various embodiments, the interview information and/or drawings to be obtained from the child are directed toward capturing a particular stage in the child's life. In such embodiments, the interview information obtained from the child serve as a way of recording the way the child thinks at the particular stage in the child's life, and the drawings to be obtained from the child serve as a way of recording how the child draws at the particular stage in the child's life. One or more embodiments of the present disclosure can be directed toward capturing particular stages in a child's development when the child is likely to provide particularly memorable statements, drawings, comments, etc.

For instance, in one or more embodiments, the interview information and/or child created drawings are directed toward capturing a particular stage in the life of a child who is not more than nine years of age. In one or more embodiments, the interview information and/or child created drawings are directed toward capturing a particular stage in the life of a child between the ages of four and eight. In one or more embodiments, the interview information and/or child created drawings are directed toward capturing a particular stage in the life of a child who is more than nine years of age. Therefore, embodiments of the present disclosure can include a personalized book that provides a captured record of one or more memorable stages in a child's development.

As such, in various embodiments, the personalized book is not a story that features the child as a character or a story written by the child. For instance, embodiments of the present disclosure do not develop stories that are pre-written (e.g., the storyline is pre-set) with a few pieces of information provided by the customer that are inserted into the pre-set storyline. Rather, the personalized book is a personalized keepsake book that features the child's own drawings combined with the child's own statements and/or comments regarding his/her world so as to capture a particular stage in the child's development.

In embodiments where the book 100 includes the capability of presenting sound, video, and/or a combination thereof, the book would have suitable storage and display capabilities for storing these types of creative inputs. For example, a memory storage unit (e.g., flash card, memory stick, smart card, etc.) may be connected to and integrated to the book. A voice synthesis module and or speaker may be included in the instance the child's voiced comments and other sounds are to be played back (i.e., presented) by the book 100. A display mechanism, such as a LCD) or plasma screen may be included for the display of video and graphics-type creative input.

Figure 2:
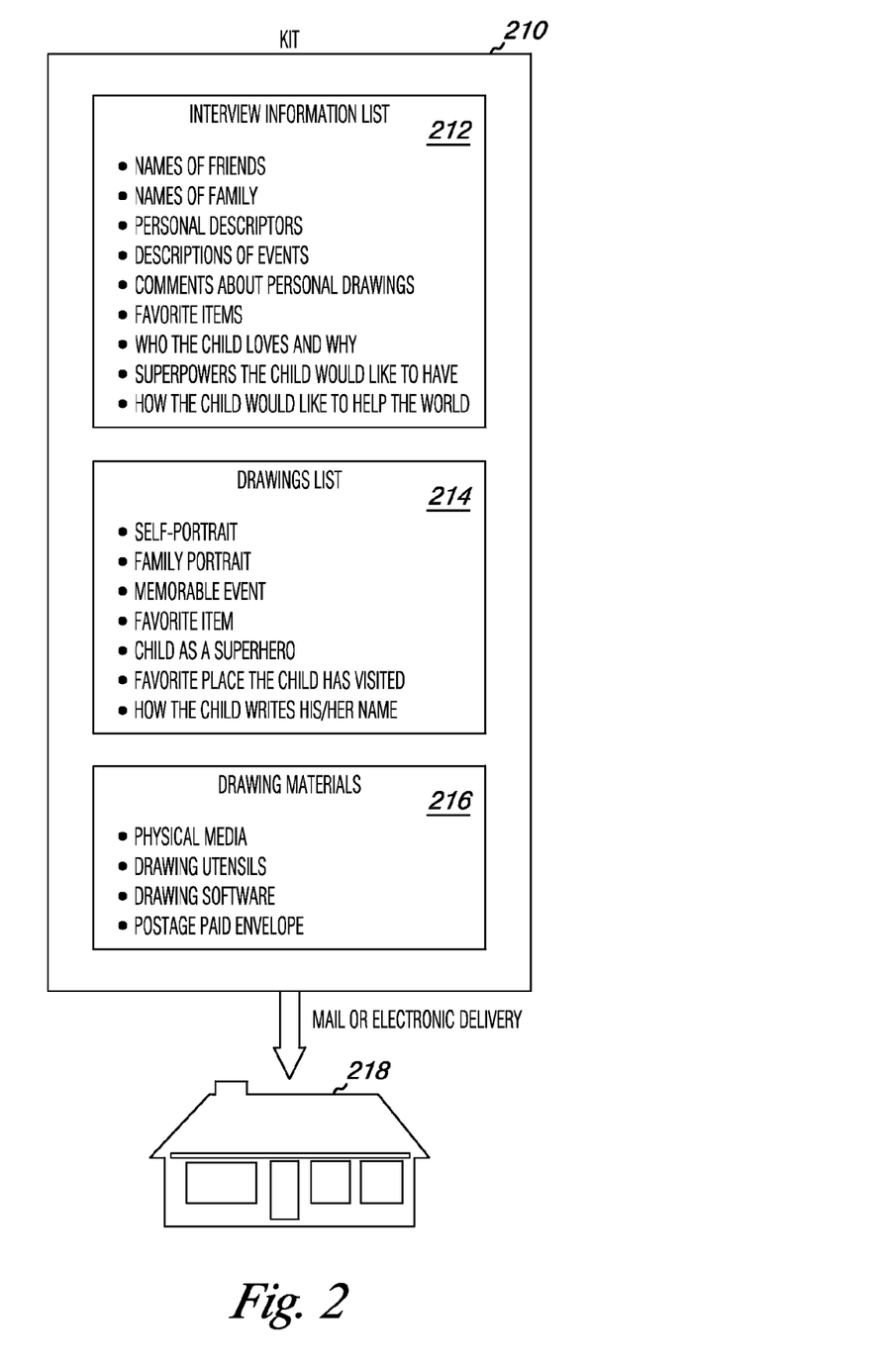
FIG. 2 illustrates an example of contents of a kit that can be used to provide a personalized book in accordance with embodiments of the present disclosure.

FIG. 2 illustrates an example of contents of a kit 210 that can be used to provide a personalized book (e.g., book 100 shown in FIG. 1) in accordance with embodiments of the present disclosure. As described above and as illustrated in the embodiment shown in FIG. 2, the contents of the kit 210 can include a list 212 of interview information to be requested from a child, a list 214 of a number of drawings to be created by the child, and a number of drawing materials 216. The contents of kit 210 can be physically or electronically sent from a publisher (i.e., from a party other than the customer and the child) to a customer desiring a personalized book. In the example shown in FIG. 2, the kit is sent to the home 218 of a customer (i.e., a parent of the child or another adult desiring a personalized book).

In the embodiment illustrated in FIG. 2, the interview information list 219 includes various information that can be provided by a child and incorporated into a personalized book (e.g., book 100 shown in FIG. 1). As described above, an adult can obtain the information associated with list 212 from the child and can provide the information to a third party, such as a publisher. As an example, the adult can provide the interview information to the publisher by filling out an interview information form (e.g., form 301 shown in FIG. 3). The form can include open-ended questions and/or fill in the blank questions, among other types of questions (e.g., types of questions designed to elicit responses from the child). The completed form can then be physically provided to the publisher (e.g., via mail) or can be provided to the publisher electronically (i.e., when the form is filled out by a parent via an online website, for instance). Alternatively, the interview information obtained from the child can be provided to the publisher as one or more audio and/or video files.

In the embodiment illustrated in FIG. 2, the interview information corresponding to list 212 includes "names of friends," "names of family," "personal descriptors," "descriptions of events," "comments about personal drawings," "favorite items," "who the child loves and why," "superpowers the child would like to have," and "how the child would like to help the world." As an example, the "personal descriptors" can include the child's own descriptions of his/her personal appearance and/or traits. Examples of "favorite items" can include favorite toys, favorite events, favorite games, favorite foods, etc. Embodiments are not so limited (i.e., the interview information can include various other subjects about which the child can provide comments, statements, descriptions, explanations, etc.).

In one or more embodiments, various means can be used in order to obtain the interview information corresponding to the list 212. For example, the adult can ask the child a number of interview questions to obtain the interview information. In various embodiments, the interview questions can be open ended questions and/or fill in the blank questions to be presented to and answered by the child. The interview questions can be a part of a questionnaire that can be provided with the kit 210.

In the embodiment illustrated in FIG. 2, the drawings list 214 includes a number of drawings to be independently created by the child and incorporated into a personalized book (e.g., book 100 shown in FIG. 1). The drawings corresponding to the list 214 can be created on a physical medium such as paper and can be mailed to the publisher. The original drawing can then be electronically scanned by the publisher for incorporation into the personalized book. Alternatively, in some embodiments, a copy of the original drawing of the child can be made via a scanner, by a parent of the child for example, and an electronic copy of the child's drawing can be electronically sent to the publisher for incorporation into the personalized book.

As illustrated in the embodiment shown in FIG. 2, the list 214 of drawings to be obtained from the child include a "self portrait," "family portrait," "memorable event," "favorite item," "child as a superhero," "favorite place the child has visited," and "how the child writes his/her name." Embodiments are not so limited. For instance, the child can be asked to independently create a number of drawings in addition to, or instead of, those shown in list 214. For instance, the list of drawings 214 can be a list of suggested drawings, from which the child or adult can select.

In various embodiments, the list 214 of drawings to be obtained from the child corresponds with the list 212 of interview information to be obtained from the child. For example, interview information associated with the list 212 of interview information to be obtained by the adult can include information related to one or more of the particular drawings independently created by the child. The related information can include one or more of the child's personal comments and/or statements related to one or more of the drawings. In various embodiments, the child's personal comments corresponding to the particular drawings can be the child's own description of the drawings. Embodiments are not so limited.

As shown in the embodiment illustrated in FIG. 2, the drawing materials 216 associated with the kit 210 can include "physical media," "drawing utensils," "drawing software," and a "postage paid envelope." The physical media can include sheets of drawing paper or another physical medium that a child can use to independently create the one or more particular drawings associated with the list 214. The drawing utensils can include markers, pens, and/or pencils, among various other drawing utensils that can be used by the child to create the one or more particular drawings associated with the list 214.

In some embodiments, the child can use a drawing software program to create the particular drawings to be incorporated in the personalized book. In embodiments in which a drawing software program is used by the child to create the particular drawings, the drawings can be electronically provided to the publisher of the personalized book via an email attachment, for example. The format of the drawings can be in various formats such as a vector format or a raster format (e.g., PDF, GIF, JPEG, or BMP, among various other suitable file formats).

In embodiments in which drawing software is utilized to create one or more drawings, those drawings can be used in addition to, or instead of, one or more drawings made by the child using physical drawings utensils and physical media. The drawing software can be provided to the customer on a physical medium such as a compact disk via mail or can be electronically provided to the customer via email or download from the publisher's website, for instance.

In various embodiments, a postage paid envelope can be physically mailed to the customer along with the kit and can be used to return the appropriate contents (e.g., a completed form containing the interview information and the number of drawings). Embodiments of the present disclosure are not limited to a particular method of providing a customer with the contents of the kit 210 (e.g., interview information list 210, drawings list 212, and drawing materials 216).

Figure 3:
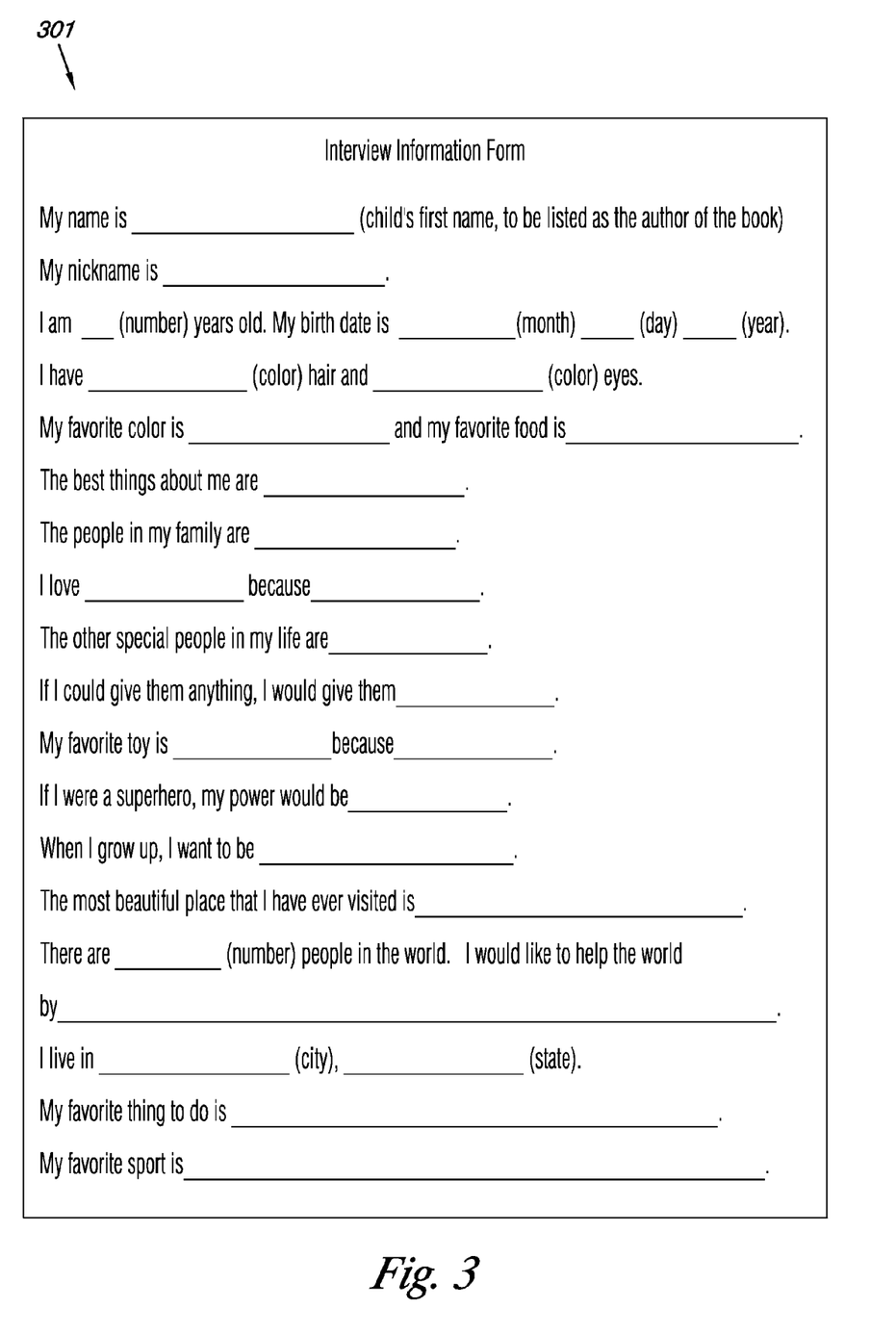
FIG. 3 illustrates an example of an interview information form in accordance with one or more embodiments of the present disclosure.

FIG. 3 illustrates an example of an interview information form 301 in accordance with one or more embodiments of the present disclosure. The form 301 can be provided to the customer as part of a kit such as kit 210 described above in connection with FIG. 2. The form 301 can be physically mailed to the customer and can be completed by the customer and the child (i.e., an adult, such as a parent of the child, can obtain responses from the child and use the responses to complete the interview information form). The interview information provided by the child (e.g., the child's answers, comments, descriptions, etc.) via form 301 can be incorporated as creative content on the pages of the personalized book (e.g., book 100 shown in FIG. 1).

In various embodiments, the interview information on form 301 that is requested by the adult can include the child's answers to a number of questions posed to the child by the adult. For instance, the adult can fill in the fields provided on form 301 with the child's answers to a number of open ended interview questions provided on the form 301. Alternatively, the form 301 could be accessed by the customer via an online website and the child's answers could be uploaded to the website for incorporation into the book by the publisher.

In various embodiments, the fields associated with form 301 can be filled with child's personal comments corresponding to particular interview information requested from the child by the adult. In one or more embodiments, the child's personal comments can include information related to at least one of the particular drawings created by the child. In one or more embodiments, the related information can be the child's description of at least one of the particular drawings.

Figure 4:
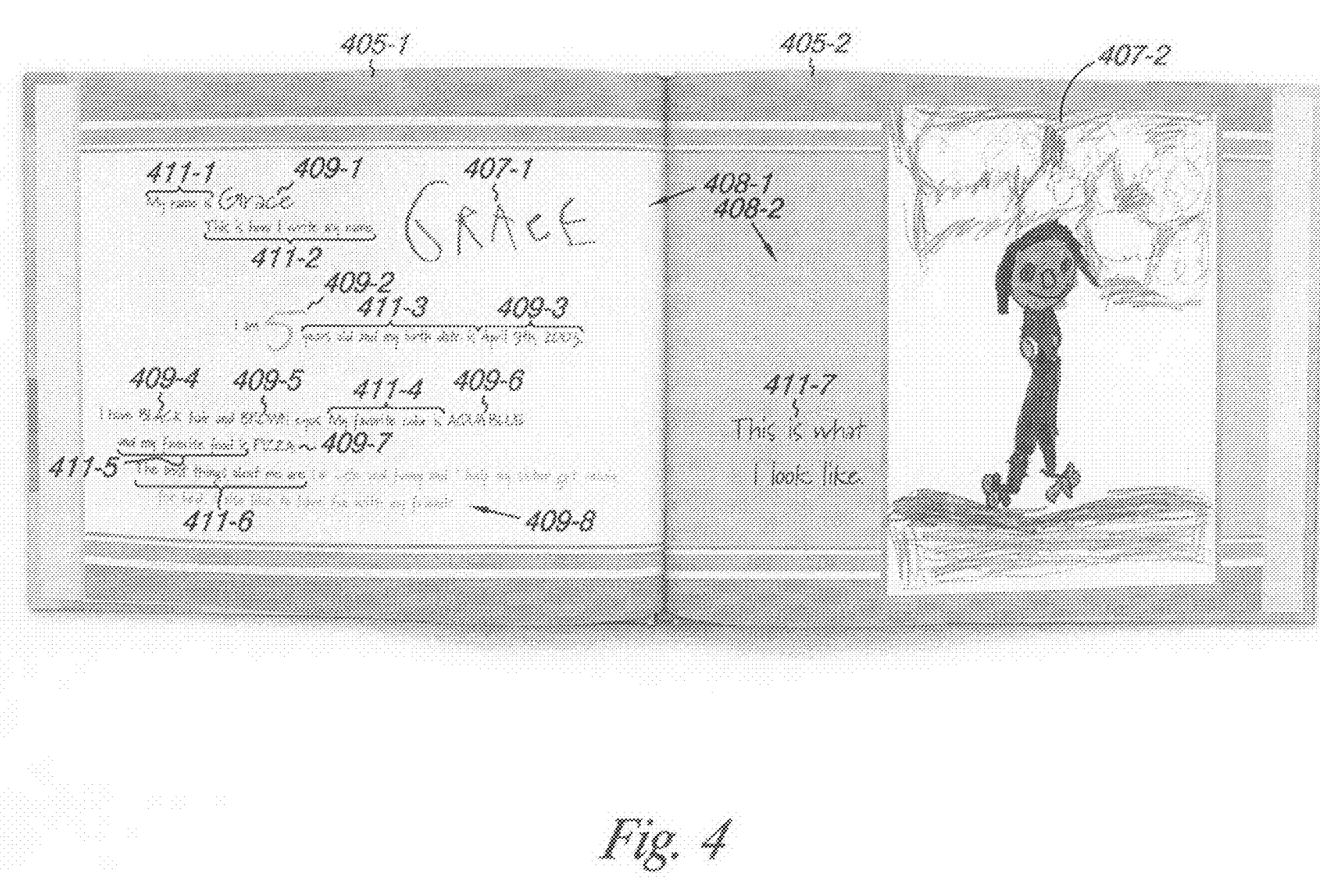
FIG. 4 illustrates an example of a portion of a personalized book in accordance with one or more embodiments of the present disclosure.
Figure 5:
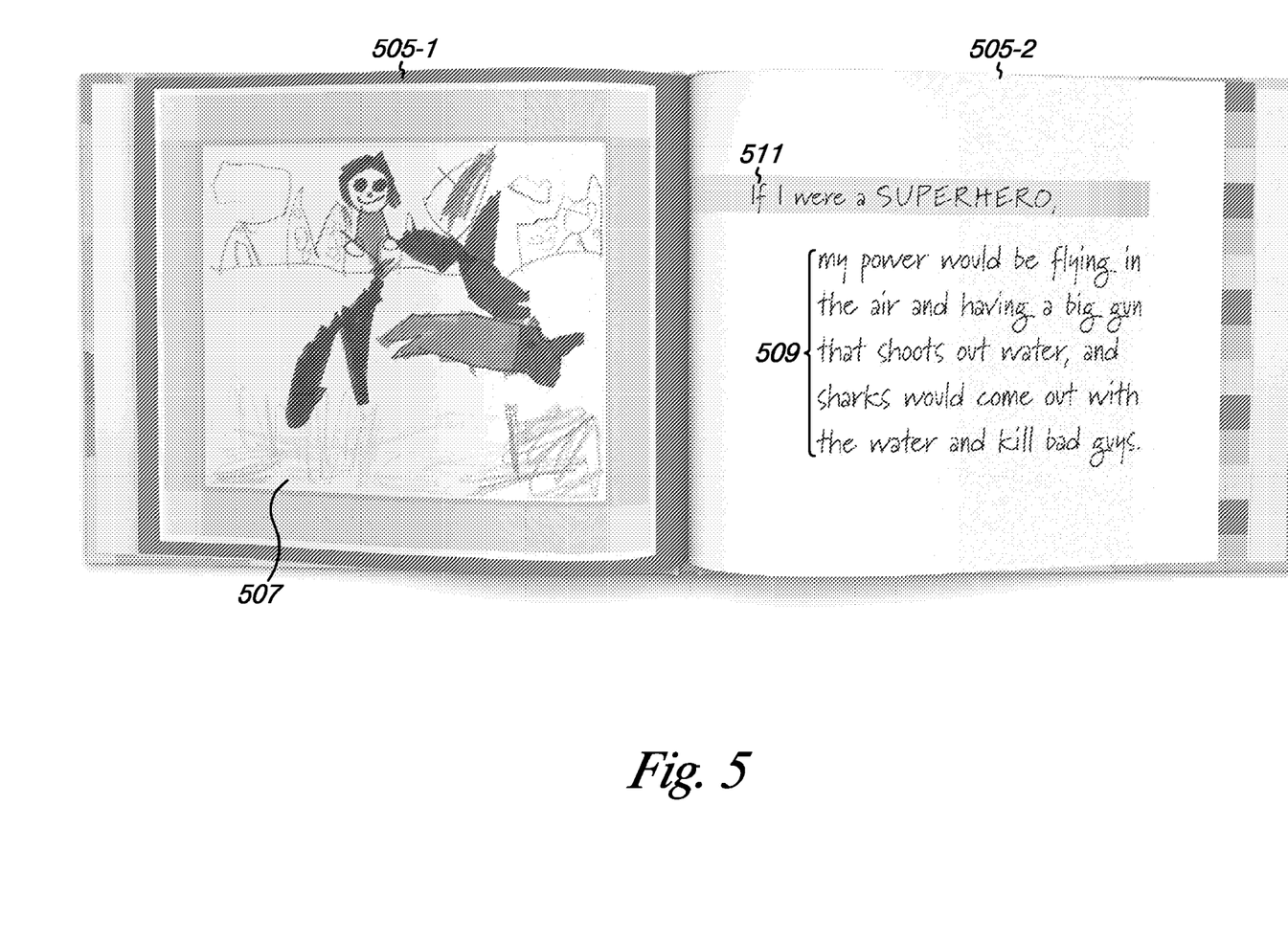
FIG. 5 illustrates another example of a portion of a personalized book in accordance with one or more embodiments of the present disclosure.

In various embodiments, and as illustrated in FIGS. 4 and 5, a particular drawing of the child can be combined with particular information related to the particular drawing (e.g., a corresponding comment of the child provided in form 301). The drawing and particular related information related thereto can be placed on the same page of the personalized book. In one or more embodiments, and as shown in FIG. 5, a particular drawing and the particular related information (e.g., related comment, statement, description, etc.) of the child can be arranged on opposing inside pages of the personalized book.

To complete the example interview information form 301 shown in FIG. 3, the child can be asked to provide various interview information. For instance, as shown in FIG. 3, the form can include fields for personal descriptors of the child such as the child's name, nickname, age, date of birth, hair color, and eye color. In various embodiments, the child can also be asked to complete the following open ended interview questions: "My favorite color is________"; "The best things about me are "________"; "The people in my family are________"; and "If I were a superhero, my power would be________"; "The most beautiful place that I have ever visited is________"; "I would like to help the world by________", among various other open ended questions such as those show in the embodiment illustrated in FIG. 3.

As illustrated in form 301, some of the open ended interview questions include multiple fields to complete. For instance, in this example, the child can be asked to complete the following interview questions; "I love________ because________" and "My favorite toy is________ because________." Embodiments are not limited to the example interview information illustrated in form 301.

As mentioned above, in various embodiments, the interview information to be obtained via an interview information form such as form 301 can correspond to specific drawings to be created by the child. For instance, as described below in connection with FIG. 5, the child can be asked to create a drawing of himself/herself as a superhero, and that particular drawing can be arranged in the personalized book near the child's answer to a related questions such as the child's answer to: "If I were a superhero, my power would be________," which can be typeset at an appropriate location in the personalized book.

FIG. 4 illustrates an example of a portion of a personalized book (e.g., book 100 shown in FIG. 1) in accordance with one or more embodiments of the present disclosure. In this example, the personalized book is about a child named Grace. That is, Grace is the particular child who would create the drawings and would provide the personal comments, answers, and/or descriptions to be incorporated into the personalized book.

The embodiment illustrated in FIG. 4 includes a first page 405-1 and a second page 405-2 of the personalized book. In this example, the pages 405-1 and 405-2 are opposing inner pages. The page 405-1 includes creative content 408-1 and the page 405-2 includes creative content 408-2. As the reader will appreciate, the creative content 408-1 and 408-2 could appear on a single page of a book. In the embodiment illustrated in FIG. 4, the creative content 408-1 includes interview information obtained via an interview information form such as form 301 described in connection with FIG. 3. That is, a number of the child's answers and/or comments obtained from fields on the interview information form (e.g., 301) have been typeset on page 405-1.

In various embodiments, and as illustrated in the embodiment shown in FIG. 4, the pages of a personalized book can include preformatted text and/or graphics that can correspond to particular drawings and/or interview information obtained from the parent and/or child. In this manner, particular personalized creative content corresponding to a particular child (e.g., a particular child's independently created drawings and/or comments) can be incorporated into the appropriate pages of the book among the preformatted text and/or graphics. As such, a personalized and customized book can be efficiently and effectively assembled by a publisher.

In the embodiment illustrated in FIG. 4, the page 405-1 includes preformatted text 411-1 ("My name is"), 411-2 ("This is how I write my name"), 411-3 ("years old and my birth date is"), 411-4 ("My favorite color is"), 411-5 ("and my favorite food is"), and 411-6 ("The best things about me are"), among other preformatted text. The page 405-1 also includes interview information 409-1 ("Grace"), 409-2 ("5"), 409-3 ("September 20$^{th}$, 2002"), 409-4 ("BLACK"), 409-5 ("BROWN"), 409-6 ("AQUA BLUE"), 409-7 ("PIZZA"), and 409-8 ("I'm cute and funny and I help my sister get ready for bed. I also like to have fun with my friends.").

The interview information 409-1, 409-2, 409-3, 409-4, 409-5, 409-6, 409-7, and 409-8 can be information obtained from the parent and/or child (e.g., via a form such as form 301 described in connection with FIG. 3) and provided to the publisher for incorporation into the appropriate page of the personalized book. As shown in FIG. 4, the interview information 409-1, 409-2, 409-3, 409-4, 409-5, 409-6, 409-7, and 409-8 is incorporated (i.e., typeset) on page 405-1 at the appropriate location corresponding to the appropriate preformatted text 411-1, 411-2, 411-3, 411-4, 411-5, and 411-6. For example, the preformatted text 411-1 ("My name is") is followed by the child's name (i.e., "Grace" 409-1). Similarly, the preformatted text 411-4 ("My favorite color is") is followed by the child's favorite color (i.e., "AQUA BLUE" 409-6, in this example).

As illustrated in the embodiment shown in FIG. 4, the preformatted text 411-6 ("The best things about me") is in the form of an open ended question such as shown in form 301 in FIG. 3. As such, the text 411-6 is followed by obtained interview information 409-8 ("I'm cute and funny and I help my sister get ready for bed. I also like to have fun with my friends."), which is the child's answer to the open ended question: "The best things about me are________."

In the embodiment illustrated in FIG. 4, the page 405-1 also includes an image 407-1. The image 407-1 is an electronic copy of the child's independently created drawing of his/her name (i.e., GRACE in this example). As shown in FIG. 4, the image 407-1 of Grace's name is located after the appropriate preformatted text 411-2 ("This is how I write my name").

In the embodiment illustrated in FIG. 4, the creative content 408-2 located on page 405-2 includes a self portrait 407-2 created by the child and incorporated into the personalized book as illustrations. The self portrait 407-2 appears after the preformatted text 411-7 ("This is what I look like"). The self portrait 407-2 is an image of the child's actual independently created drawing.

In various embodiments, the images incorporated into the personalized book (e.g., images 407-1 and 407-2) can be drawn by the child and then sent to the publisher where they can be scanned and an electronic image of the drawing can be incorporated into the personalized book. Alternatively, the child's particular drawings (e.g., of his/her own name and of him/her self, in the example shown in FIG. 4) can be scanned at home (e.g., by the customer) and the electronic image files can be provided to the publisher (e.g., via an email attachment or via upload to a website of the publisher).

As noted above, the child's drawings 407-1 and 407-2 can be particular drawings of a number of particular drawings independently created by the child for incorporation into the personalized book. In various embodiments, the drawings can be created at the direction of the adult. For instance, the adult can request the child to create one or more particular drawings from a list of drawings associated with a kit (e.g., kit 210 described in FIG. 2).

FIG. 5 illustrates another example of a portion of a personalized book (e.g., book 100 shown in FIG. 1) in accordance with one or more embodiments of the present disclosure. The embodiment illustrated in FIG. 5 includes a first page 505-1 and a second page 505-2 of the personalized book. In this example, the pages 505-1 and 505-2 are opposing inner pages. As the reader will appreciate, the content of pages 505-1 and 505-2 could appear on a single page of the personalized book.

In the embodiment illustrated in FIG. 5, the page 505-1 includes an image 507 of a particular drawing created by the child. The drawing depicted in image 507 is of the child as a superhero. The drawing depicted in image 507 can be created by the child upon a request from an adult such as a parent, for example. For instance, the adult can direct the child to create the drawing of the child as a superhero as one of a number of drawings from a drawings list associated with a personalized book kit (e.g., drawing list 214 associated with kit 210 shown in FIG. 2).

The page 505-2 includes preformatted text 511 ("If I were a SUPERHERO, my power would be"). The preformatted text 511 corresponds to an open ended fill in the blank question posed to the child by an adult. For instance, the child can be asked to provide interview information in the form of his/her own comment to complete the statement, "If I were a superhero, my power would be___________." As an example, the fill in the blank interview question can be one of a number of open ended and/or fill in the blank type interview questions associated with an interview information form such as form 301 described in FIG. 3.

As shown in FIG. 5, the page 505-2 also includes interview information 509 in the form of the child's actual comment about what his/her power would be if he/she were a superhero. That is, the child's actual comment can be provided to the publisher via an interview information form (e.g., form 301 shown in FIG. 3) or other suitable method, and the actual comment can then by typeset at the appropriate location on the appropriate page (e.g., 505-2).

In various embodiments, and as illustrated in FIG. 5, the particular interview information (e.g., 509) obtained from the child (e.g., the child's personal comment about what his/her power would be if he/she were a superhero) is typeset in close proximity to an image (e.g., 507) of a particular drawing related to the typeset interview information (e.g., a drawing created by the child depicting him/her as a superhero). That is, a particular drawing can be arranged near, or on the same page as, one or more of the child's personal comments and/or descriptions associated with the particular drawing. Embodiments of the present disclosure are not limited to the personalized book pages described in connection with FIGS. 4 and 5.

Figure 6:
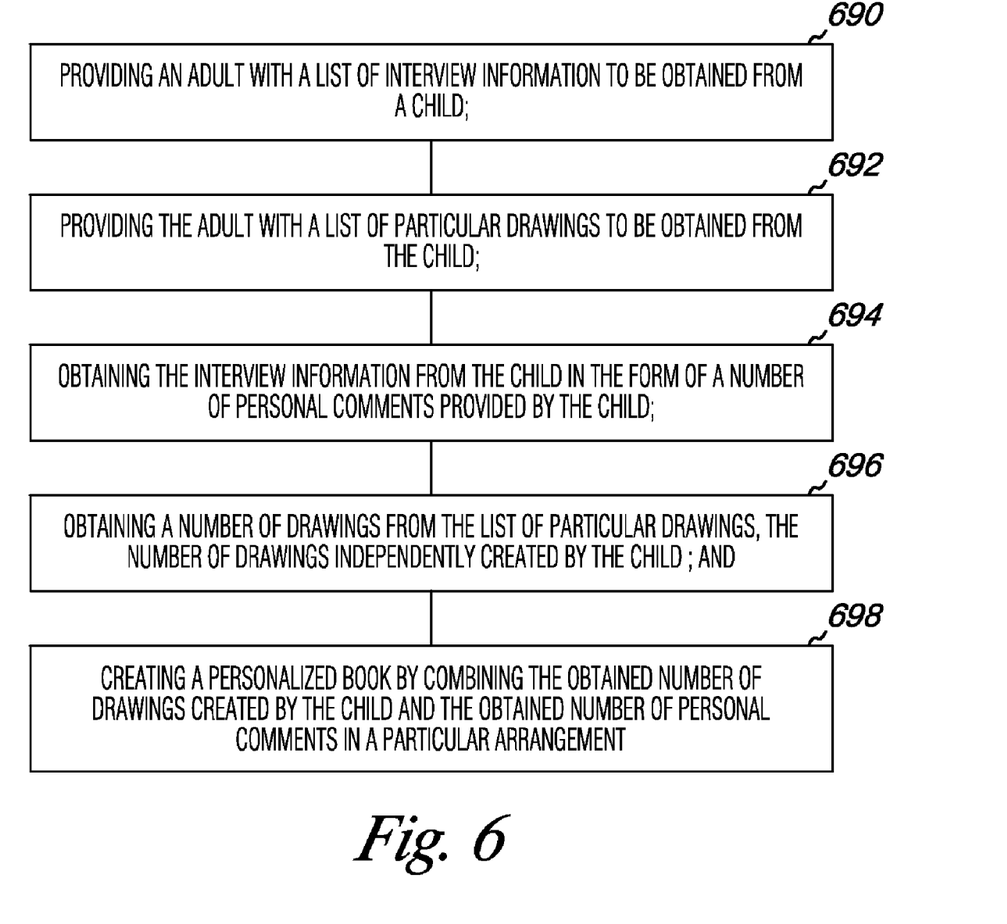
FIG. 6 illustrates a method for providing a personalized book according to an embodiment of the present disclosure.

FIG. 6 illustrates a method for providing a personalized book according to an embodiment of the present disclosure. At block 690, the method includes providing an adult with a list of interview information to be obtained from a child. As described above, the list of interview information to be obtained from the child can be provided in an interview information form (e.g., form 310 described in FIG. 3). The interview information to be obtained from the child can include information such as names of family members, names of friends, favorite items, personal descriptors, as well as the child's comments and/or answers to a number of open-ended and/or fill in the blank questions, for example.

At block 692, the method includes providing the adult with a list of particular drawings to be obtained from the child. The list of particular drawings can be a list such as list 214 shown in FIG. 2 and can include a self-portrait, a family portrait, a favorite item, or a memorable event, a beautiful place the child has visited, a drawing of the child as a superhero, among various other particular drawings created by the child.

At block 694, the method includes obtaining the interview information front the child in the form of a number of personal comments provided by the child. The personal comments can include the child's own answers to questions posed by the adult to the child and/or the child's own descriptions of various topics (e.g., family members, friends, favorite items, personal descriptors, the child's own drawings, etc.).

At block 696, the method includes obtaining a number of drawings from the list of particular drawings (e.g., from a list provided by a third party such as a publisher). As described above, in various embodiments, the drawings are independently created by the child.

At block 698, the method includes creating a personalized book by combining the obtained number of drawings created by the child and the obtained number of personal comments in a particular arrangement. Examples of particular arrangements of child created drawings combined with a number of personal comments are described in connection with FIGS. 4 and 5.

In various embodiments, the method described in FIG. 6 can include utilizing a third party to: provide the adult with the list of interview information to be obtained from the child; provide the adult with the list of particular drawings to be created by the child; obtain the interview information from the child in the form of a number of personal comments provided by the child; obtain the number of drawings from the list of particular drawings; and assemble the personalized book.

The method illustrated in FIG. 6 can be used to provide a personalized book that includes a captured record of one or more memorable stages in a child's development. The personalized book is more than a story about the child or a story written by the child in that the personalized book in accordance with embodiments of the present disclosure is a personalized keepsake book that features the child's own drawings and/or statements and comments regarding his/her world.

Figure 7:
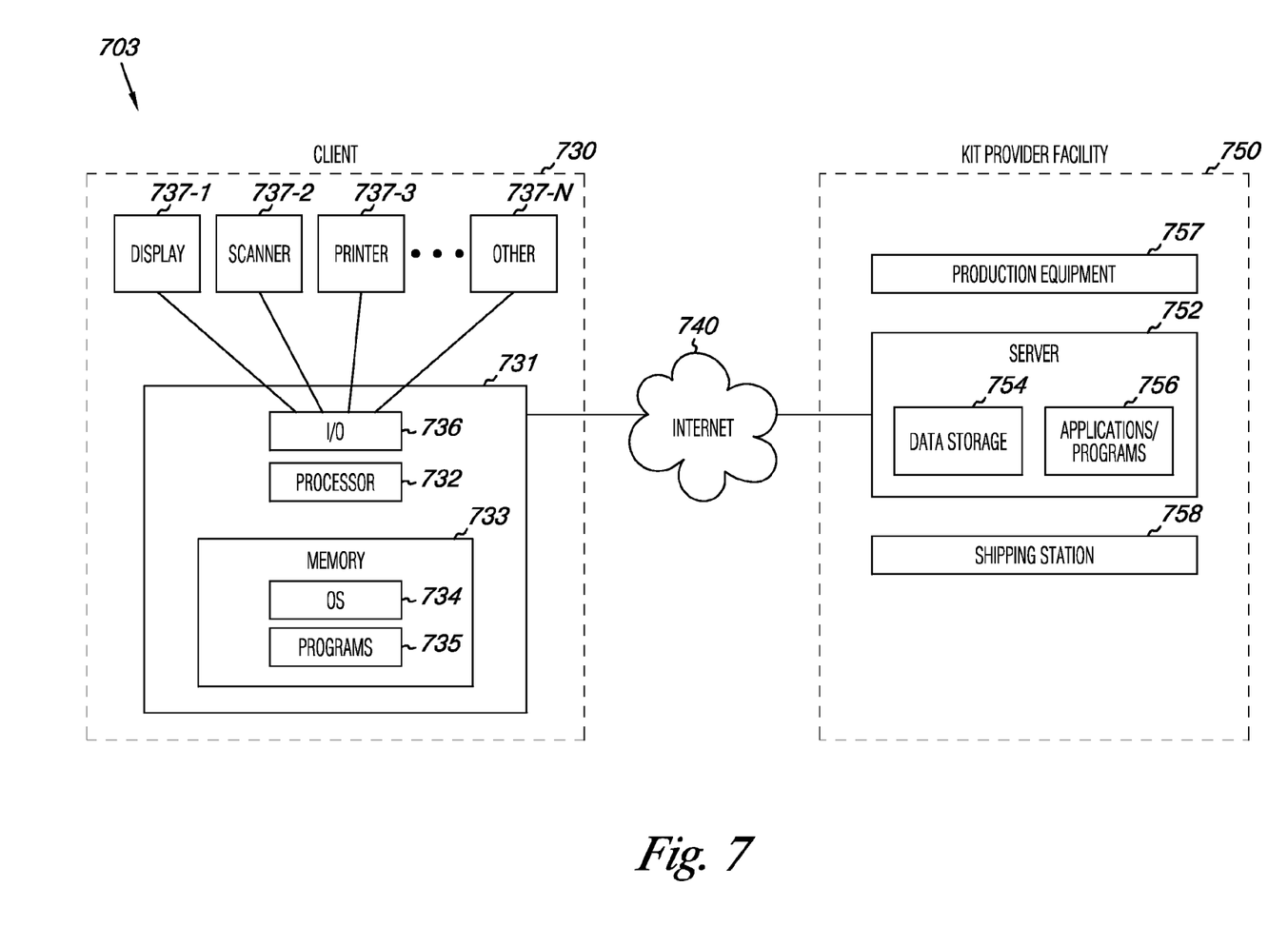
FIG. 7 illustrates a system for providing a personalized book according to an embodiment of the present disclosure.

FIG. 7 illustrates a system 703 for providing a personalized book (e.g., personalized book 100 shown in FIG. 1) according to an embodiment of the present disclosure. In the embodiment illustrated in FIG. 7, system 703 includes a client facility 730 and a kit provider facility 750, which can be in communication via a network 740 (e.g., the Internet).

In various embodiments, the client facility 730 can be a customer location such as the home or office of an adult, such as parent, desiring a personalized book. In the embodiment illustrated in FIG. 7, the client facility 730 includes a computing device 731. The computing device 731 can be a personal computer, a laptop computer, a personal digital assistant (PDA), or a cellular telephone, among various other computing devices capable of wired and/or wireless communication via network 740.

In the embodiments illustrated in FIG. 7, the computing device includes a processor 732 and a memory 733. The memory 733 can include random access memory (RAM) and read only memory (ROM), among various other types of storage media such as Flash memory, for example. The memory 733 can be used to store an operating system (OS) 734 and one or more programs (i.e., one or more sets of computer executable instructions) that can be executed by the processor 732 to perform various functions associated with providing a personalized book in accordance with embodiments described herein. As an example, the programs 735 can include a drawing software program such as Adobe Photoshop, AutoCAD, or Sketchup, among various other drawing software applications.

In the embodiment illustrated in FIG. 7, the computing device 731 includes an input/output (I/O) component 736 that can facilitate communication between the computing device 731 and a number of input/output devices and/or peripheral devices. For instance, in the embodiment illustrated in FIG. 7, the computing device 731 is in communication with a display 737-1, a scanner 737-2, a printer 737-3, and one or more other devices 737-N via I/O component 736.

In the embodiment illustrated in FIG. 7, the kit provider facility 750 includes a server 752, production equipment 757, and a shipping station 758. The kit provider facility 750 of system 703 can be operated by a publishing entity that can create, assemble, and ship a completed personalized book to a customer.

The server 752 can be a computing device that can communicate with one or more client computing devices (e.g., 731) via the Internet 740. The server 752 can include a data storage component 754 that can be used to store customer data files (e.g., interview information in the form of the child's personal comments and/or child created drawings in the form of image files received from a customer). The server 752 also includes one or more applications/programs 756 that can be executed to create the pages of a personalized book (e.g., by combining received interview information and child created drawings in a particular arrangement as described herein above). That is, the applications/programs 756 can manipulate (i.e., create, edit, store, etc.) text and graphics to create one or more personalized books as described herein. For example, the applications 756 can be used to retrieve interview information such as the child's personal comments from an interview information form such as form 301 described in connection with FIG. 3. The applications can also be used to place the retrieved interview information and/or child created drawings in the appropriate locations on the pages of the personalized book.

The production equipment 757 can include equipment such as printers for printing images on physical media, scanners for producing digital image files from physical media, and other finishing equipment for assembling personalized books (e.g., equipment used for cutting, folding, stapling, gluing, binding, etc.). The production equipment 757 can be located locally or remotely to the server 752.

In the embodiment illustrated in FIG. 7, the shipping station 758 can be used to provide functions such as confirming customer orders, envelope printing and sealing, packaging, labeling, package weighing, postage metering, and shipping the completed personalized books to customers. The completed personalized books can be physically mailed to customers or can be provided as electronic books via email attachment, for example.

The embodiment illustrated in FIG. 7 is an electronic system 703, but as the reader will appreciate, embodiments of the present disclosure are not limited to electronic systems. For instance, a kit such as kit 210 described in FIG. 2 can be physically mailed to a customer and the interview information in the form of the child's comments and the child's independently created drawings can be mailed back to the publisher for physical assembly of the personalized book. In embodiments in which the customer requests a kit via mail, the publisher can mail the contents of the kit along with a postage-paid envelope such that the child created drawings and completed interview information form can be mailed back to the publisher for inclusion in the personalized book.

CONCLUSION

Personalized books as well as kits and methods for providing personalized books have been described herein. One method includes: providing an adult with a list of interview information to be obtained from a child; providing the adult with a list of particular drawings to be obtained from the child; obtaining the interview information from the child in the form of a number of personal comments provided by the child; obtaining a number of drawings from the list of particular drawings, the number of drawings independently created by the child; and creating a personalized book by combining the obtained number of drawings created by the child and the obtained number of personal comments in a particular arrangement.

Although specific embodiments have been illustrated and described herein, those ordinary skill in the art will appreciate that an arrangement calculated to achieve the same results can be substituted for the specific embodiments shown. This disclosure is intended to cover adaptations or variations of one or more embodiments of the present disclosure.

It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for providing a personalized book, the method comprising:
   providing an adult with a list of interview information to be obtained from a child;
   providing the adult with a list of particular drawings to be obtained from the child;
   obtaining the interview information from the child in the form of a number of personal comments provided by the child;
   obtaining a number of drawings from the list of particular drawings, the number of drawings independently created by the child; associating in a computing device at least one of the number of personal comments with a particular one of the obtained number of drawings; and
   selecting with the computing device the particular one of the obtained number of drawings and arranging with the computing device the selected particular one of the obtained number of drawings near the associated at least one of the number of personal comments in the personalized book.

2. The method of claim 1, including providing the adult with a kit that includes: the list of interview information to be obtained from the child;
   the list of particular drawings to be obtained by the child; and
   a number of drawing materials for use by the child.

3. The method of claim 1, including electronically providing the adult with at least one of:
   the list of interview information via an online website; and
   the list of particular drawings via an online website.

4. The method of claim 1, including electronically obtaining, via an online website, at least one of:
   the number of personal comments provided by the child; and
   the number of drawings from the list of particular drawings.

5. The method of claim 1, wherein providing the list of interview information to be obtained from the child and providing the list of particular drawings to be obtained from the child includes providing lists directed toward capturing a particular stage in the child's life.

6. The method of claim 1, wherein providing the adult with the list of interview information to be obtained from the child includes providing at least one open-ended question to be asked to the child by the adult and answered by the child.

7. The method of claim 1, including utilizing a third party to:
   provide the adult with the list of interview information to be obtained from the child;
   provide the adult with the list of particular drawings to be created by the child;
   obtain the interview information from the child in the form of a number of personal comments provided by the child;
   obtain the number of drawings from the list of particular drawings; and
   assemble the personalized book.

8. A method for providing a personalized book, the method comprising:
   obtaining a number of drawings from a list of drawings created by a child at the direction of an adult, the list of drawings provided by a third party;
   obtaining the child's personal comments corresponding to particular interview information requested from the child by the adult, the particular interview information being from a list of interview information to be requested from the child by the adult, wherein the list of interview information is provided by the third party;
   associating with a computing device a particular one of the number of drawings with a particular one of the child's personal comments related to the particular one of the number of drawings;
   and
   creating the personalized book by arranging with the computing device the particular one of the number of drawings near the particular one of the child's personal comments.

9. The method of claim 8, wherein at least one drawing created by the child is a self portrait.

10. The method of claim 8, wherein the list of interview information to be requested from the child includes at least some of the following:
    names of friends;
    names of family members;
    a favorite toy;
    a favorite game;
    a favorite sport;
    a favorite food; and
    an answer to one of a number of open ended questions.

11. The method of claim 8, wherein the interview information requested by the adult includes requests for the child's answers to a number of questions posed to the child by the adult.

12. The method of claim 8, wherein at least one drawing created by the child is a family portrait.

13. The method of claim 8, wherein the child's personal comments corresponding to the particular interview information requested from the child by the adult are recorded by the adult via at least one of an audio recording and a video recording prior to being provided to the third party.

14. A method for providing a personalized book, the method comprising:
    providing a list of interview information to be obtained by an adult in the form of a child's personal comments corresponding to particular interview information requested by the adult to capture a particular stage in the child's development;
    providing a list of suggested drawings to be independently created by the child, the drawings independently created by the child to serve as illustrations for the personalized book and to capture the particular stage in the child's development;
    wherein the list of interview information to be obtained by the adult in the form of the child's personal comments includes particular information related to the suggested drawings;
    providing a computing device with a processor and memory having a set of executable instructions for:
    associating with the computing device at least one of the child's personal comments with a particular one of the drawings independently created by the child; and
    selecting with the computing device the particular one of the drawings and arranging with the computing device the particular one of the drawings near the associated at least one of the child's personal comments in the personalized book.

15. The method of claim 14, wherein the particular information related to the suggested drawings includes the child's descriptions of the drawings.

16. The method of claim 14, including providing a number of materials for use by the child in creating the suggested drawings.

17. The method of claim 16, wherein the number of materials for use by the child in creating the suggested drawings includes a drawing software program.

18. The method of claim 14, including mailing a kit that includes the list of interview information and the list of drawings to at least one of a parent and a guardian of the child, and wherein the kit includes a postage paid envelope.

* * * * *